(12) United States Patent
Chen et al.

(10) Patent No.: US 10,883,524 B2
(45) Date of Patent: Jan. 5, 2021

(54) ELASTIC ELEMENT

(71) Applicant: Cheng Uei Precision Industry Co., LTD., New Taipei (TW)

(72) Inventors: Jun Chen, Dong-Guan (CN); Zhi-Bin Dong, Dong-Guan (CN); Feng Zhu, Dong-Guan (CN)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/565,484

(22) Filed: Sep. 9, 2019

(65) Prior Publication Data

US 2020/0309172 A1   Oct. 1, 2020

(30) Foreign Application Priority Data

Mar. 28, 2019   (CN) ..................... 2019 2 0411763 U

(51) Int. Cl.
*F16B 2/22* (2006.01)
*H01R 12/71* (2011.01)

(52) U.S. Cl.
CPC ............ *F16B 2/22* (2013.01); *H01R 12/716* (2013.01)

(58) Field of Classification Search
CPC .... F16B 2/22; F16B 2/24; F16B 2/241; F16B 2/243; Y10T 24/307; H01R 9/16; H01R 12/716; H01H 1/58; H01H 1/5844; H01H 1/5822; H01H 2011/062
See application file for complete search history.

(56) References Cited

U.S. PATENT DOCUMENTS

| | | | | |
|---|---|---|---|---|
| 8,523,580 B2* | 9/2013 | Midorikawa | ........ | H01R 12/716 439/74 |
| 8,888,506 B2* | 11/2014 | Nishimura | ......... | H01R 12/7082 439/74 |
| 2010/0068900 A1* | 3/2010 | Wu | ....................... | H01R 12/716 439/74 |
| 2010/0221928 A1* | 9/2010 | Sato | ...................... | H01R 12/716 439/74 |
| 2011/0045708 A1* | 2/2011 | Ooi | ...................... | H01R 12/716 439/676 |
| 2012/0122350 A1* | 5/2012 | Choi | .................... | H01R 12/716 439/660 |

(Continued)

*Primary Examiner* — Robert Sandy
*Assistant Examiner* — Rowland Do
(74) *Attorney, Agent, or Firm* — Cheng-Ju Chiang

(57) ABSTRACT

An elastic element includes a fastening portion, an extending portion connected with the fastening portion, a first bending portion, a first connecting portion connected with the first bending portion, a second bending portion, a second connecting portion, a third connecting portion, a first elastic arm, a fourth connecting portion and a second elastic arm. The first bending portion is connected with a front end of the extending portion. The second bending portion is connected with the first connecting portion. The second connecting portion is connected with a front of the second bending portion. The third connecting portion is connected with a front of the second connecting portion. The first elastic arm is connected with a front end of the third connecting portion. The fourth connecting portion is connected with the first elastic arm. The second elastic arm is connected with a front end of the fourth connecting portion.

12 Claims, 2 Drawing Sheets

(56) References Cited

U.S. PATENT DOCUMENTS

| | | | | |
|---|---|---|---|---|
| 2012/0214353 A1* | 8/2012 | Midorikawa | ...... | H01R 13/2407 |
| | | | | 439/733.1 |
| 2013/0295784 A1* | 11/2013 | Hasegawa | ............ | H01R 12/716 |
| | | | | 439/55 |
| 2013/0316598 A1* | 11/2013 | Yoshioka | ............. | H01R 12/716 |
| | | | | 439/733.1 |
| 2014/0227899 A1* | 8/2014 | Tanaka | ................. | H01R 13/631 |
| | | | | 439/357 |
| 2014/0227910 A1* | 8/2014 | Tanaka | ............... | H01R 13/6275 |
| | | | | 439/626 |
| 2014/0378007 A1* | 12/2014 | Miyazaki | ............... | H01R 13/20 |
| | | | | 439/816 |
| 2017/0098900 A1* | 4/2017 | Kobuchi | ............... | H01R 13/405 |
| 2017/0125930 A1* | 5/2017 | Komoto | ............... | H01R 12/716 |
| 2019/0115051 A1* | 4/2019 | Ishizaki | ............... | G11B 25/043 |
| 2020/0176909 A1* | 6/2020 | Kobayashi | ............. | H01R 12/57 |

\* cited by examiner

ELASTIC ELEMENT

CROSS-REFERENCE TO RELATED APPLICATION

The present application is based on, and claims priority from, China Patent Application No. 201920411763.3, filed Mar. 28, 2019, the disclosure of which is hereby incorporated by reference herein in its entirety.

BACKGROUND OF THE INVENTION

1. Field of the Invention

The present invention generally relates to an elastic element, and more particularly to an elastic element having a larger positive bearing capacity and without a permanent deformation.

2. The Related Art

A conventional elastic element is mainly applied in controlling a movement, alleviating an impact or shock, storing energies and a measurement force of a mechanical element. However, when the conventional elastic element is in use and exerted by an external force, the conventional elastic element is overloaded in use on account of a design of the conventional elastic element to cause a permanent deformation. Thereby a damage rate of the conventional elastic element is higher and a lower positive bearing capacity of a contact point of the conventional elastic element is lowered.

In view of the above-mentioned problems, an innovative elastic element with a larger positive bearing capacity and without a permanent deformation is essential to be provided.

SUMMARY OF THE INVENTION

An object of the present invention is to provide an elastic element. The elastic element includes a fastening portion, an extending portion, a first bending portion, a first connecting portion, a second bending portion, a second connecting portion, a third connecting portion, a first elastic arm, a fourth connecting portion and a second elastic arm. The extending portion is connected with and extended towards a frontward direction from a front of the fastening portion. The first bending portion is connected with and bent towards an upward direction from a front end of the extending portion. The first connecting portion is connected with and extended towards the upward direction from a top of the first bending portion. The second bending portion is connected with and bent towards the frontward direction from a top of the first connecting portion. The second connecting portion is connected with and extended towards the frontward direction from a front of the second bending portion. The third connecting portion is connected with a front of the second connecting portion, and bent towards a downward direction and the frontward direction from the front of the second connecting portion. The first elastic arm is connected with a front end of the third connecting portion. The first elastic arm is slantwise extended towards the frontward direction and the downward direction, then arched towards the frontward direction, and further slantwise extended towards the downward direction and a rearward direction from the front end of the third connecting portion. The fourth connecting portion is connected with a bottom of the first elastic arm. The fourth connecting portion is bent towards the frontward direction, then extended towards the frontward direction and further bent towards the upward direction and the rearward direction from the bottom of the first elastic arm. The second elastic arm is connected with a front end of the fourth connecting portion. The second elastic arm is slantwise extended towards the upward direction and the rearward direction, then arched towards the rearward direction and further slantwise extended towards the frontward direction and the upward direction from the front end of the fourth connecting portion. The first elastic arm has a first upper transition portion connected with a front end of the third connecting portion, and a first contact portion connected with and arched towards the frontward direction from a bottom end of the first upper transition portion from the front end of the third connecting portion, the first upper transition portion is slantwise extended towards the frontward direction and the downward direction from a bottom of the front end of the third connecting portion, the second elastic arm has a second lower transition portion connected with a top of the front end of the fourth connecting portion, and a second contact portion connected with and arched towards the rearward direction from a top end of the second lower transition portion, the second lower transition portion is slantwise extended towards the upward direction and the rearward direction from the front end of the fourth connecting portion, a docking terminal is inserted between and is connected with the first contact portion of the first elastic arm and the second contact portion of the second elastic arm, when the docking terminal moves within a distance of 0.4 mm towards the frontward direction or the rearward direction, positive bearing forces of the first contact portion and the second contact portion of the elastic element in the rearward direction and the frontward direction respectively are greater than 1 N.

Another object of the present invention is to provide an elastic element. The elastic element includes a fastening portion, an extending portion, a first bending portion, a first connecting portion, a second bending portion, a second connecting portion, a third connecting portion, a first upper transition portion, a first contact portion, a first lower transition portion, a fourth connecting portion, a second lower transition portion, a second contact portion and a second upper transition portion. The extending portion is connected with and extended towards a frontward direction from a front of the fastening portion. The first bending portion is connected with and bent towards an upward direction from a front end of the extending portion. The first connecting portion is connected with and extended towards the upward direction from a top of the first bending portion. The second bending portion is connected with and bent towards the frontward direction from a top of the first connecting portion. The second connecting portion is connected with and extended towards the frontward direction from a front of the second bending portion. The third connecting portion is connected with a front of the second connecting portion, and bent towards a downward direction and the frontward direction from the front of the second connecting portion. The first upper transition portion is connected with a front end of the third connecting portion. The first upper transition portion is slantwise extended towards the frontward direction and the downward direction from a bottom of the front end of the third connecting portion. The first contact portion is connected with and arched towards the frontward direction from a bottom end of the first upper transition portion. The first lower transition portion is connected with a bottom of the first contact portion, and slantwise extended towards the downward direction and a rearward direction from the bottom of the first contact portion. The fourth connecting portion is connected with a bottom of the first lower transition portion, and the fourth connecting portion is bent towards the frontward direction, and then extends horizontally towards the frontward direction and is further bent towards the upward direction and the rearward direction from the bottom of the first lower transition portion. The second lower transition portion is connected with a top of a front end of the fourth connecting portion, and the second lower transition portion is slantwise extended towards the upward direction and the rearward direction from the front end of the fourth connecting portion. The second contact portion is connected with and arched towards the rearward direction from a top end of the second lower transition portion. The second upper transition portion is connected with a top end of the second contact portion, and the second upper transition portion is slantwise extended towards the frontward direction and the upward direction from the top end of the second contact portion. The elastic element is fastened to a base, a middle of the fastening portion has a fastening hole, the base has a main portion, and a fastening block protruded upward from a top surface of the main portion, the fastening block is fastened in the fastening hole.

Another object of the present invention is to provide an elastic element fastened to a base. The base has a main portion, and a fastening block protruded upward from a top surface of the main portion. The elastic element includes a fastening portion, an extending portion, a first bending portion, a first connecting portion, a second bending portion, a second connecting portion, a third connecting portion, a first elastic arm, a fourth connecting portion and a second elastic arm. A middle of the fastening portion has a fastening hole. The fastening block is fastened in the fastening hole. The extending portion is extended towards a frontward direction from a front of the fastening portion. The first bending portion is bent towards an upward direction from a front end of the extending portion. The first connecting portion is extended towards the upward direction from a top of the first bending portion. The second bending portion is bent towards the frontward direction from a top of the first connecting portion. The second connecting portion is extended towards the frontward direction from a front of the second bending portion. The third connecting portion is bent towards a downward direction and the frontward direction from the front of the second connecting portion. The first elastic arm is slantwise extended towards the frontward direction and the downward direction, then arched towards the frontward direction, and further slantwise extended towards the downward direction and a rearward direction from a front end of the third connecting portion. The fourth connecting portion is bent towards the frontward direction, then extended towards the frontward direction and further bent towards the upward direction and the rearward direction from a bottom of the first elastic arm. The second elastic arm is slantwise extended towards the upward direction and the rearward direction, then arched towards the rearward direction and further slantwise extended towards the frontward direction and the upward direction from a front end of the fourth connecting portion.

As described above, because the elastic element has an innovative structure design, when a docking terminal presses towards the rearward direction against the first contact portion in the elastic element to deviate to the first largest distance position from the second contact portion, a deformation extent of the first elastic arm of the elastic element is limited to a first certain scope, when the docking terminal presses towards the frontward direction against the second contact portion in the elastic element to deviate to the second largest distance position from the first contact portion, the deformation extent of the second elastic arm of the elastic element is limited to a second certain scope, positive bearing capacities of the first contact portion and the second contact portion of the elastic element in the rearward direction and the frontward direction respectively exceed a certain force, so that the elastic element will be without a permanent deformation. As a result, the elastic element has a larger positive bearing capacity.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
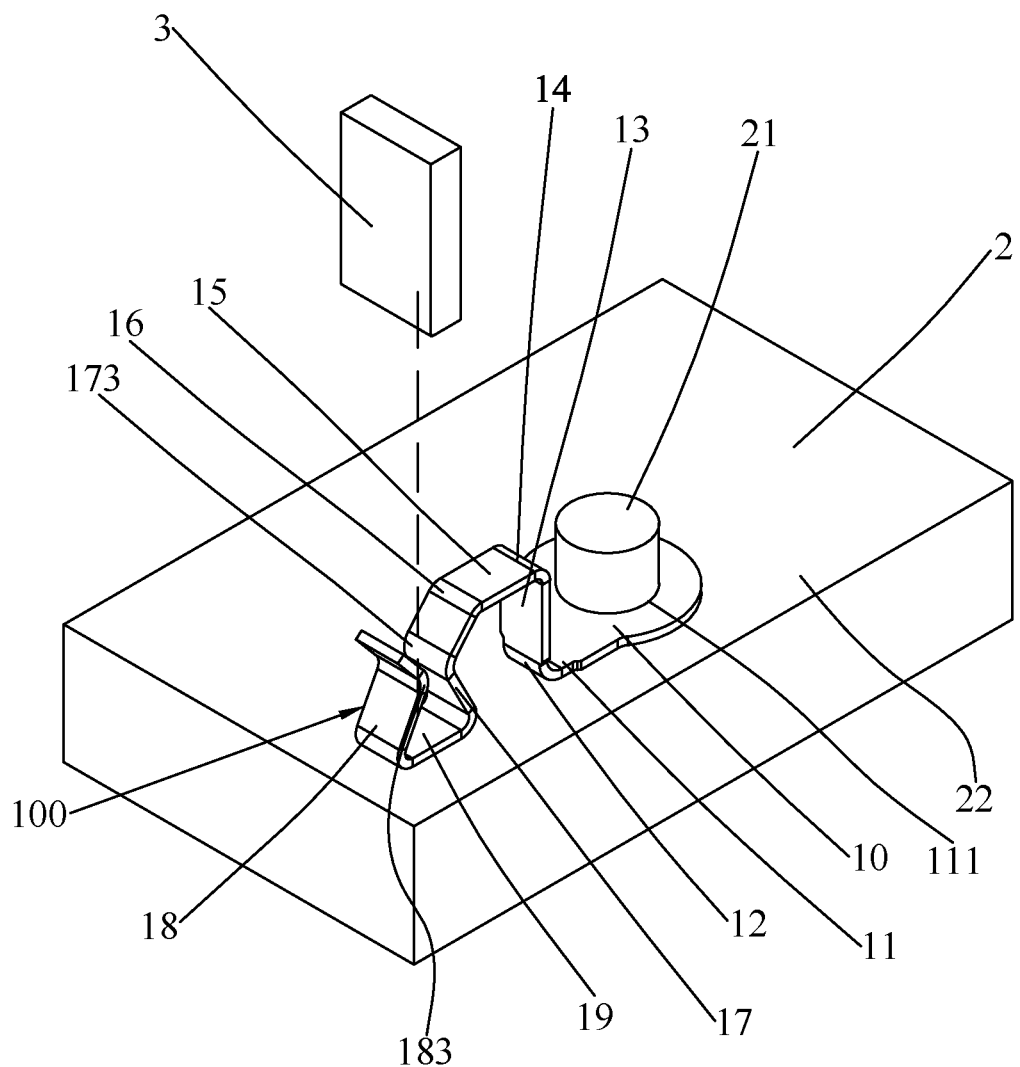
FIG. 1 is a perspective view of an elastic element in accordance with a preferred embodiment of the present invention.
Figure 2:
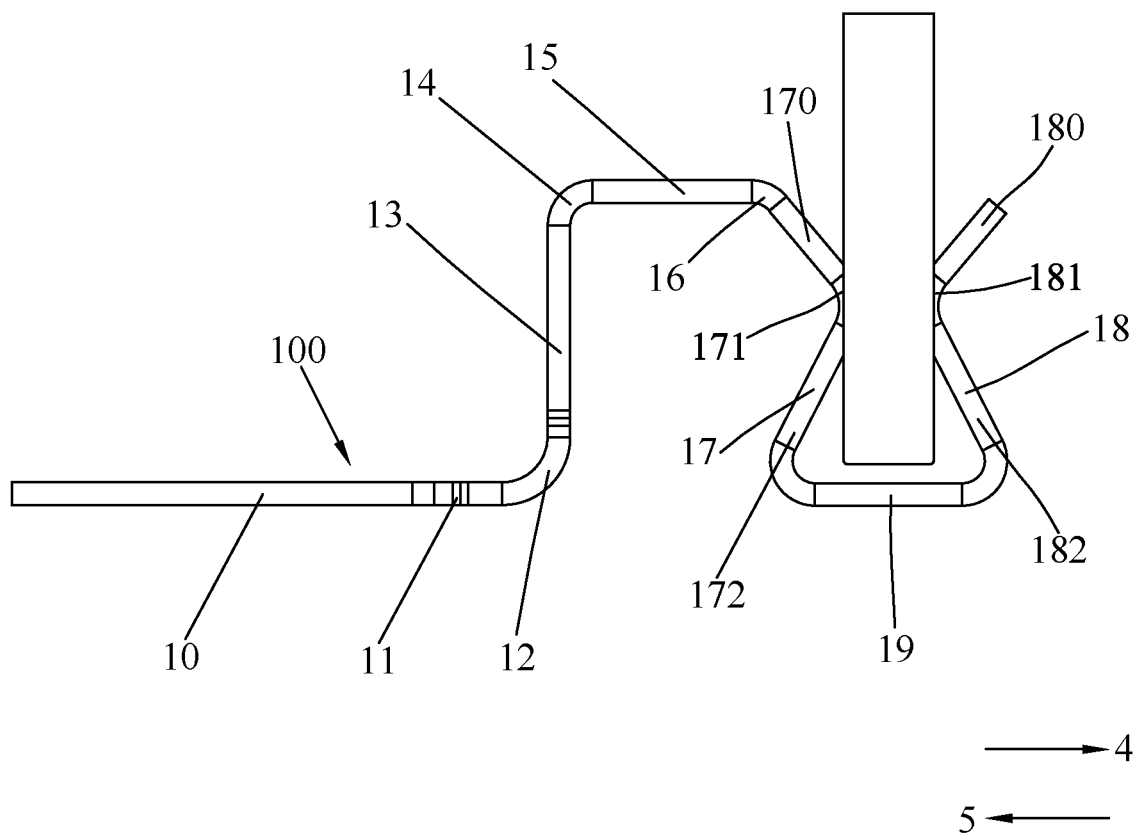
FIG. 2 is a schematic diagram of the elastic element connecting with a docking terminal.

With reference to FIG. 1 and FIG. 2, an elastic element 100 in accordance with a preferred embodiment of the present invention is shown. The elastic element 100 is fastened to a base 2, and is used for being connected with a docking terminal 3.

The elastic element 100 has a fastening portion 10, an extending portion 11 connected with and extended towards a frontward direction 4 from a front of the fastening portion 10, a first bending portion 12 connected with and bent towards an upward direction from a front end of the extending portion 11, a first connecting portion 13 connected with and extended towards the upward direction from a top of the first bending portion 12, a second bending portion 14 connected with and bent towards the frontward direction 4 from a top of the first connecting portion 13, a second connecting portion 15 connected with and extended towards the frontward direction 4 from a front of the second bending portion 14, a third connecting portion 16 connected with a front of the second connecting portion 15, and bent towards a downward direction and the frontward direction 4 from the front of the second connecting portion 15, a first elastic arm 17 connected with a front end of the third connecting portion 16, a fourth connecting portion 19 connected with a bottom of the first elastic arm 17, and a second elastic arm 18 connected with a front end of the fourth connecting portion 19. The second elastic arm 18 is located in front of and spaced from the first elastic arm 17.

The first elastic arm 17 is slantwise extended towards the frontward direction 4 and the downward direction, then arched towards the frontward direction 4, and further slantwise extended towards the downward direction and a rearward direction 5 from the front end of the third connecting portion 16. The fourth connecting portion 19 is bent towards the frontward direction 4, then extended towards the frontward direction 4 and further bent towards the upward direction and the rearward direction 5 from the bottom of the first elastic arm 17. The second elastic arm 18 is slantwise extended towards the upward direction and the rearward direction 5, then arched towards the rearward direction 5 and further slantwise extended towards the frontward direction 4 and the upward direction from the front end of the fourth connecting portion 19. The rearward direction 5 is opposite to the frontward direction 4.

The first elastic arm 17 has a first upper transition portion 170 connected with the front end of the third connecting portion 16, a first contact portion 171 connected with and arched towards the frontward direction 4 from a bottom end of the first upper transition portion 170, and a first lower transition portion 172 connected with a bottom of the first contact portion 171, and slantwise extended towards the downward direction and the rearward direction 5 from the bottom of the first contact portion 171. The second elastic arm 18 has a second lower transition portion 182 connected with a top of the front end of the fourth connecting portion 19, and then slantwise extended towards the upward direction and the rearward direction 5 from the front end of the fourth connecting portion 19, a second contact portion 181 connected with and arched towards the rearward direction 5 from a top end of the second lower transition portion 182, and a second upper transition portion 180 connected with a top end of the second contact portion 181, and the second upper transition portion 180 is slantwise extended towards the frontward direction 4 and the upward direction from a top end of the second contact portion 181. A bottom of the first lower transition portion 172 is bent towards the frontward direction 4, and then extends horizontally towards the frontward direction 4 and is further bent towards the upward direction and the rearward direction 5 to form the fourth connecting portion 19. The fourth connecting portion 19 is connected with the bottom of the first lower transition portion 172, and the fourth connecting portion 19 is bent towards the frontward direction 4, and then extends horizontally towards the frontward direction 4 and is further bent towards the upward direction and the rearward direction 5 from the bottom of the first lower transition portion 172. A top of the front end of the fourth connecting portion 19 slantwise extends towards the upward direction and the rearward direction 5 to form the second lower transition portion 182. The first upper transition portion 170 is slantwise extended towards the frontward direction 4 and the downward direction from a bottom of the front end of the third connecting portion 16. The first elastic arm 17 and the second elastic arm 18 are disposed as a mirror image.

The elastic element 100 is made of a plate. The fastening portion 10 is of a plate shape and disposed horizontally. A middle of the fastening portion 10 has a fastening hole 111. The extending portion 11 is of a plate shape and disposed horizontally. The first bending portion 12 is of an arc plate shape. The first connecting portion 13 is of the plate shape and disposed vertically. The second bending portion 14 is of the arc plate shape. The second connecting portion 15 is of the plate shape and disposed horizontally. The third connecting portion 16 is of the arc plate shape. The fourth connecting portion 19 is of the plate shape and disposed horizontally. The first upper transition portion 170 is of the plate shape. The first lower transition portion 172 is of the plate shape. The first contact portion 171 is of the arc plate shape and is connected between the bottom end of the first upper transition portion 170 and a top end of the first lower transition portion 172. The second upper transition portion 180 is of the plate shape. The second lower transition portion 182 is of the plate shape. The second contact portion 181 is of the arc plate shape. The second contact portion 181 is connected between a bottom end of the second upper transition portion 180 and the top end of the second lower transition portion 182. A first convex surface 173 of the first contact portion 171 faces towards the frontward direction 4. A second convex surface 183 of the second contact portion 181 faces towards the rearward direction 5.

The base 2 has a rectangular main portion 22, and a fastening block 21 protruded upward from a top surface of the main portion 22. The fastening block 21 is of a cylinder shape. The fastening block 21 is matched with the fastening hole 111. The fastening block 21 is fastened in the fastening hole 111 for realizing locating and fastening the elastic element 100 to the base 2.

The docking terminal 3 is inserted between and is connected with the first contact portion 171 of the first elastic arm 17 and the second contact portion 181 of the second elastic arm 18 of the elastic element 100 to make the elastic element 100 afford a positive force to generate a deformation. The docking terminal 3 contacts with the first contact portion 171 of the first elastic arm 17 and the second contact portion 181 of the second elastic arm 18 of the elastic element 100. The docking terminal 3 is clamped between the first convex surface 173 and the second convex surface 183. When the docking terminal 3 presses towards the rearward direction 5 against the first contact portion 171 in the elastic element 100 to deviate to a first largest distance position from the second contact portion 181, a deformation extent of the first elastic arm 17 of the elastic element 100 is limited to a first certain scope. When the docking terminal 3 presses towards the frontward direction 4 against the second contact portion 181 in the elastic element 100 to deviate to a second largest distance position from the first contact portion 171, a deformation extent of the second elastic arm 18 of the elastic element 100 is limited to a second certain scope. Positive bearing capacities of the first contact portion 171 and the second contact portion 181 of the elastic element 100 in the rearward direction 5 and the frontward direction 4 respectively exceed a certain force, so that the elastic element 100 will be without a permanent deformation. The elastic element 100 has a larger positive bearing capacity.

In the preferred embodiment, when the docking terminal 3 moves within a distance of 0.4 mm towards the frontward direction 4 or the rearward direction 5, positive bearing forces of the first contact portion 171 and the second contact portion 181 of the elastic element 100 in the rearward direction 5 and the frontward direction 4 respectively are greater than 1 N.

As described above, because the elastic element 100 has an innovative structure design, when the docking terminal 3 presses towards the rearward direction 5 against the first contact portion 171 in the elastic element 100 to deviate to the first largest distance position from the second contact portion 181, the deformation extent of the first elastic arm 17 of the elastic element 100 is limited to the first certain scope, when the docking terminal 3 presses towards the frontward direction 4 against the second contact portion 181 in the elastic element 100 to deviate to the second largest distance position from the first contact portion 171, the deformation extent of the second elastic arm 18 of the elastic element 100 is limited to the second certain scope, the positive bearing capacities of the first contact portion 171 and the second contact portion 181 of the elastic element 100 in the rearward direction 5 and the frontward direction 4 respectively exceed the certain force, so that the elastic element 100 will be without the permanent deformation. As a result, the elastic element 100 has the larger positive bearing capacity.

What is claimed is:
1. An elastic element, comprising:
a fastening portion;

an extending portion connected with and extended towards a frontward direction from a front of the fastening portion;

a first bending portion connected with and bent towards an upward direction from a front end of the extending portion;

a first connecting portion connected with and extended towards the upward direction from a top of the first bending portion;

a second bending portion connected with and bent towards the frontward direction from a top of the first connecting portion;

a second connecting portion connected with and extended towards the frontward direction from a front of the second bending portion;

a third connecting portion connected with a front of the second connecting portion, and bent towards a downward direction and the frontward direction from the front of the second connecting portion;

a first elastic arm connected with a front end of the third connecting portion, the first elastic arm being slantwise extended towards the frontward direction and the downward direction, then arched towards the frontward direction, and further slantwise extended towards the downward direction and a rearward direction from the front end of the third connecting portion;

a fourth connecting portion connected with a bottom of the first elastic arm, the fourth connecting portion being bent towards the frontward direction, then extended towards the frontward direction and further bent towards the upward direction and the rearward direction from the bottom of the first elastic arm; and a second elastic arm connected with a front end of the fourth connecting portion, the second elastic arm being slantwise extended towards the upward direction and the rearward direction, then arched towards the rearward direction and further slantwise extended towards the frontward direction and the upward direction from the front end of the fourth connecting portion;

wherein the first elastic arm has a first upper transition portion connected with a front end of the third connecting portion, and a first contact portion connected with and arched towards the frontward direction from a bottom end of the first upper transition portion from the front end of the third connecting portion, the first upper transition portion is slantwise extended towards the frontward direction and the downward direction from a bottom of the front end of the third connecting portion, the second elastic arm has a second lower transition portion connected with a top of the front end of the fourth connecting portion, and a second contact portion connected with and arched towards the rearward direction from a top end of the second lower transition portion, the second lower transition portion is slantwise extended towards the upward direction and the rearward direction from the front end of the fourth connecting portion, a docking terminal is inserted between and is connected with the first contact portion of the first elastic arm and the second contact portion of the second elastic arm, when the docking terminal moves within a distance of 0.4 mm towards the frontward direction or the rearward direction, positive bearing forces of the first contact portion and the second contact portion of the elastic element in the rearward direction and the frontward direction respectively are greater than 1 N.

2. The elastic element as claimed in claim 1, wherein the first elastic arm has a first lower transition portion connected with a bottom of the first contact portion, and slantwise extended towards the downward direction and the rearward direction from the bottom of the first contact portion, the second elastic arm has a second upper transition portion connected with a top end of the second contact portion, and the second upper transition portion is slantwise extended towards the frontward direction and the upward direction from the top end of the second contact portion.

3. The elastic element as claimed in claim 2, wherein a bottom of the first lower transition portion is bent towards the frontward direction, and then extends horizontally towards the frontward direction and is further bent towards the upward direction and the rearward direction to form the fourth connecting portion.

4. The elastic element as claimed in claim 2, wherein a top of the front end of the fourth connecting portion slantwise extends towards the upward direction and the rearward direction to form the second lower transition portion.

5. The elastic element as claimed in claim 2, wherein the first upper transition portion is of a plate shape, the first lower transition portion is of the plate shape, the first contact portion is of an arc plate shape and is connected between the bottom end of the first upper transition portion and a top end of the first lower transition portion, the second upper transition portion is of the plate shape, the second lower transition portion is of the plate shape, the second contact portion is of the arc plate shape and is connected between a bottom end of the second upper transition portion and the top end of the second lower transition portion.

6. The elastic element as claimed in claim 1, wherein a first convex surface of the first contact portion faces towards the frontward direction, a second convex surface of the second contact portion faces towards the rearward direction, the docking terminal is clamped between the first convex surface and the second convex surface.

7. The elastic element as claimed in claim 1, wherein the extending portion is of a plate shape and disposed horizontally, the first connecting portion is of the plate shape and disposed vertically, the second connecting portion is of the plate shape and disposed horizontally, the fourth connecting portion is of the plate shape and disposed horizontally.

8. The elastic element as claimed in claim 1, wherein the second elastic arm is located in front of and spaced from the first elastic arm.

9. The elastic element as claimed in claim 1, wherein the first elastic arm and the second elastic arm are disposed as a mirror image.

10. The elastic element as claimed in claim 1, wherein the elastic element is fastened to a base, a middle of the fastening portion opens has a fastening hole, the base has a main portion, and a fastening block protruded upward from a top surface of the main portion, the fastening block is fastened in the fastening hole.

11. An elastic element, comprising:
a fastening portion;
an extending portion connected with and extended towards a frontward direction from a front of the fastening portion;
a first bending portion connected with and bent towards an upward direction from a front end of the extending portion;
a first connecting portion connected with and extended towards the upward direction from a top of the first bending portion;

a second bending portion connected with and bent towards the frontward direction from a top of the first connecting portion;

a second connecting portion connected with and extended towards the frontward direction from a front of the second bending portion;

a third connecting portion connected with a front of the second connecting portion, and bent towards a downward direction and the frontward direction from the front of the second connecting portion;

a first upper transition portion connected with a front end of the third connecting portion, the first upper transition portion being slantwise extended towards the frontward direction and the downward direction from a bottom of the front end of the third connecting portion;

a first contact portion connected with and arched towards the frontward direction from a bottom end of the first upper transition portion;

a first lower transition portion connected with a bottom of the first contact portion, and slantwise extended towards the downward direction and a rearward direction from the bottom of the first contact portion;

a fourth connecting portion connected with a bottom of the first lower transition portion, and the fourth connecting portion being bent towards the frontward direction, and then extending horizontally towards the frontward direction and being further bent towards the upward direction and the rearward direction from the bottom of the first lower transition portion;

a second lower transition portion connected with a top of a front end of the fourth connecting portion, and the second lower transition portion being slantwise extended towards the upward direction and the rearward direction from the front end of the fourth connecting portion;

a second contact portion connected with and arched towards the rearward direction from a top end of the second lower transition portion; and a second upper transition portion connected with a top end of the second contact portion, and the second upper transition portion being slantwise extended towards the frontward direction and the upward direction from the top end of the second contact portion;

wherein the elastic element is fastened to a base, a middle of the fastening portion has a fastening hole, the base has a main portion, and a fastening block protruded upward from a top surface of the main portion, the fastening block is fastened in the fastening hole.

12. An elastic element fastened to a base, the base having a main portion, and a fastening block protruded upward from a top surface of the main portion, the elastic element comprising:

a fastening portion, a middle of the fastening portion having a fastening hole, the fastening block being fastened in the fastening hole;

an extending portion extended towards a frontward direction from a front of the fastening portion;

a first bending portion bent towards an upward direction from a front end of the extending portion;

a first connecting portion extended towards the upward direction from a top of the first bending portion;

a second bending portion bent towards the frontward direction from a top of the first connecting portion;

a second connecting portion extended towards the frontward direction from a front of the second bending portion;

a third connecting portion bent towards a downward direction and the frontward direction from the front of the second connecting portion;

a first elastic arm slantwise extended towards the frontward direction and the downward direction, then arched towards the frontward direction, and further slantwise extended towards the downward direction and a rearward direction from a front end of the third connecting portion;

a fourth connecting portion bent towards the frontward direction, then extended towards the frontward direction and further bent towards the upward direction and the rearward direction from a bottom of the first elastic arm; and a second elastic arm slantwise extended towards the upward direction and the rearward direction, then arched towards the rearward direction and further slantwise extended towards the frontward direction and the upward direction from a front end of the fourth connecting portion.

* * * * *